US007682476B2

(12) United States Patent
Sutton

(10) Patent No.: US 7,682,476 B2
(45) Date of Patent: Mar. 23, 2010

(54) METHOD TO CREATE 3-DIMENSIONAL IMAGES FROM A 2-DIMENSIONAL IMAGE

(76) Inventor: Ralph Sutton, #2 Bowline Bay Ct., Hilton Head Island, SC (US) 29926

( * ) Notice: Subject to any disclaimer, the term of this patent is extended or adjusted under 35 U.S.C. 154(b) by 580 days.

(21) Appl. No.: 11/690,599

(22) Filed: Mar. 23, 2007

(65) Prior Publication Data

US 2007/0221320 A1 Sep. 27, 2007

Related U.S. Application Data

(60) Provisional application No. 60/785,807, filed on Mar. 27, 2006.

(51) Int. Cl.
*B29C 65/50* (2006.01)
*B32B 37/02* (2006.01)
*B32B 38/04* (2006.01)
*B32B 38/14* (2006.01)

(52) U.S. Cl. ....................... 156/250; 156/256; 156/258; 156/267; 156/277; 283/94; 283/107; 283/109; 283/904; 40/124.01; 40/800; 83/869; 83/25; 83/29; 83/40; 83/167

(58) Field of Classification Search ................. 156/250, 156/256, 258, 267, 277; 283/94, 107, 109, 283/904; 40/124.01, 800; 83/869, 25, 29, 83/40, 167
See application file for complete search history.

(56) References Cited

U.S. PATENT DOCUMENTS 2,183,426 A * 12/1939 Hart ............................ 40/410
2,591,779 A * 4/1952 Buck .......................... 428/138
2,889,651 A * 6/1959 Baldanza ..................... 264/547
3,758,358 A * 9/1973 Kuroda ........................ 156/222
3,798,806 A * 3/1974 Sanford ................... 40/124.03
3,917,786 A * 11/1975 Weigert ...................... 264/129
D250,520 S * 12/1978 Heavener ................... D11/140
4,546,019 A * 10/1985 Schneider .................... 428/13
5,003,745 A * 4/1991 Fang ........................... 52/316
5,072,304 A * 12/1991 Abe et al. ................... 358/296
5,181,745 A * 1/1993 Jacobsen et al. .............. 283/94
5,217,675 A * 6/1993 Fujisawa et al. ............ 376/195
5,277,736 A * 1/1994 Logan ......................... 156/247
5,288,358 A * 2/1994 Logan ......................... 152/268

(Continued)

FOREIGN PATENT DOCUMENTS

JP 2002254899 A * 9/2002

OTHER PUBLICATIONS

English Abstract of JP 2002-254899.*

*Primary Examiner*—Philip C Tucker
*Assistant Examiner*—Sing P Chan
(74) *Attorney, Agent, or Firm*—Richard Mark Blank, Esquire

(57) ABSTRACT

This is a method to create 3-dimensional images from a 2-dimensional image. This Method utilizes various pieces of paper produced within the process and a method of attachment all together with layering and spacing in 3-dimensions to create a final piece of artwork which is 3-dimensional. Among other uses the end product of this method can be used as a free standing work of art which can be matted and framed and placed either hanging or attached to a wall or other surface or placed on an easel or other tripod mechanism for free standing on a table or floor or other surface.

20 Claims, 7 Drawing Sheets

U.S. PATENT DOCUMENTS 5,389,413 A * 2/1995 Condon et al. ............. 428/41.9
5,441,778 A * 8/1995 Gilbreath et al. .............. 428/13
5,470,410 A * 11/1995 Keating et al. ................ 156/63
5,667,747 A * 9/1997 Harding et al. ............. 264/510
5,904,962 A * 5/1999 Harding et al. ............... 428/14
5,985,379 A * 11/1999 Longsdorf et al. ............ 428/13
6,010,387 A * 1/2000 Nemec et al. ............... 446/327
6,106,023 A * 8/2000 Sud et al. .................... 283/117
6,216,896 B1 * 4/2001 Chern et al. ................ 264/642
6,444,148 B2 * 9/2002 Harding ..................... 264/40.1
6,582,801 B1 * 6/2003 Schmitt ...................... 428/209
6,764,568 B1 * 7/2004 Sud ............................ 156/245
6,945,785 B2 * 9/2005 Sohl et al. ................... 434/408
2009/0246436 A1 * 10/2009 Gorin et al. ................... 428/39

* cited by examiner

METHOD TO CREATE 3-DIMENSIONAL IMAGES FROM A 2-DIMENSIONAL IMAGE

CROSS-REFERENCE TO RELATED APPLICATION

This application claims the benefit under 35 U.S.C. §119 (e) of any U.S. provisional application(s) listed below.

Application No. 60/785,807 Filing Date Mar. 27, 2006

FIELD OF THE INVENTION

This is a method to create 3-dimensional images from a 2-dimensional image. Among other uses the end product of this method can be used as a free standing work of art which can be matted and framed and placed either hanging or attached to a wall or other surface or placed on an easel or other tripod mechanism for free standing on a table or floor or other surface.

BACKGROUND OF THE INVENTION

Consumers purchase and collect art of all different genre, sizes, and shapes. Some art is mass produced and sold in quantity and some only one of a kind originals or lesser amounts. The consumers utilize art in many different ways. Some simply collect and store art, others like to display it and show off their tastes, and yet others have a variety of uses for these items. There are many artists, celebrities, manufacturers, retailers, other persons, and companies competing for the consumers business in artwork sales. Artists are continuously experimenting to come up with new and unique ways and methods to produce artworks which are different and can stand out and be noticed by the consumer.

It is desirable that a new method of creating unique art be provided such that a purchaser of art can have new and different, unique choices of content, format, and/or medium.

It is therefore an objective of the present invention to provide a method for creating a new and different type of art work, style, and format that does not have the drawbacks or shortcomings of two dimensional art. We see the world in three dimensions. Traditional art is only produced in two dimensions therefore methods for producing 3-dimensional artwork allow for the production of images that look more real, more close to reality.

It is another object of the present invention to provide a method to create 3-dimensional images from 2-dimensional images which can be duplicated for quantity production and sold to consumers. It is important that when the method is used in mass production or quantity production the cost of using this method in production becomes a cost effective way of producing affordable 3-dimensional works of art for sale to consumers. Also a method that is easily performed in quantity such as this one would be preferred.

Other objects and advantages of the invention method will appear when the below sections and description are read and when they are read in connection with the accompanying drawings.

SUMMARY OF THE INVENTION

In accordance with the present invention, this is a method to create 3-dimensional images from a 2-dimensional image. Among other uses the end product of this method can be used as a free standing work of art which can be matted and framed and placed either hanging or attached to a wall or other surface or placed on an easel or other tripod mechanism for free standing on a table or floor or other surface. This Method utilizes the cut out pieces of paper produced within the process and a method of attachment all together with layering and spacing in 3-dimensions to create a final piece of artwork which is 3-dimensional.

PREFERRED EMBODIMENT

In a preferred embodiment, the method for creating 3-dimensional images from 2-dimensional images can be carried out by selecting an image that you would like to have created by this 3-dimensional method, making copies of the image in a size you desire, and building up and out a 3-d version from the center of a pre-selected background. By using the measuring techniques outlined in the steps of the claims below and cutting various pieces and shapes from paper. Placement of the paper cut outs on top of each other in the air space above the background mat board or mat paper in any direction there from, using layering in 3 dimensions, using spacing to add depth by utilizing foam tape or other material as building blocks to hold the colored cut outs in a perpendicular fashion. Then the final artwork is matted and framed with glass insert.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
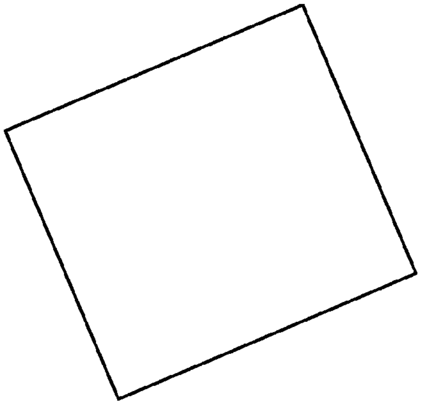
FIG. 1 depicts a piece of mat board that will be cut and used as the background upon which the 3-d cut pieces produced by this method will be mounted onto either directly or by attaching them to intermediate building blocks (i.e. foam tape), as they will be mounted in layers.
Figure 2:
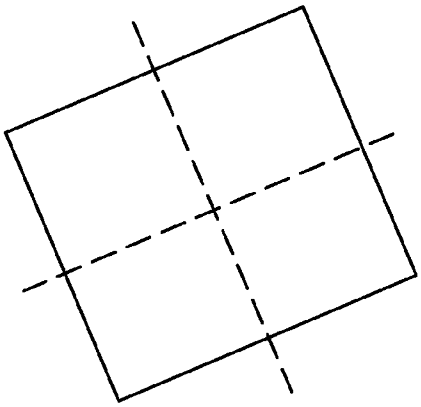
FIG. 2 depicts the background mat board after a pencil is used to create cross marks which are placed onto the mat board for alignment purposes.
Figure 3:
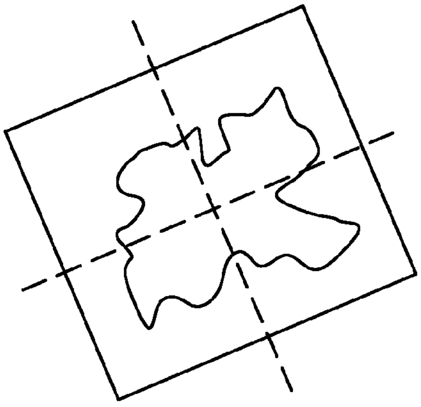
FIG. 3 depicts a copy which is usually Black and White that has been produced by using a copy machine or other known method of reproducing images on paper which shows a copy of the original image in the size the creator, using this method, has selected, whether it be the same dimensions as the original or a enlarged or shrunken image and further shows the pencil marks that were placed upon it for alignment purposes.
Figure 4:
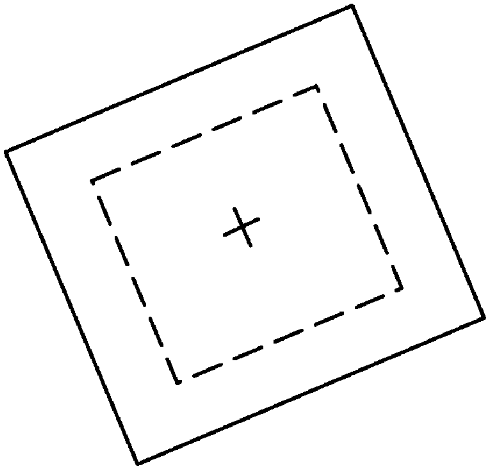
FIG. 4 depicts the background mat board with additional pencil marks that are created to indicate space on all four sides of the mat board. This space is to be left clear for mating and framing, when centering the various 3-d image, cut out pieces, created by this method to be placed upon said background mat, either directly or by way of an intermediate.
Figure 5:
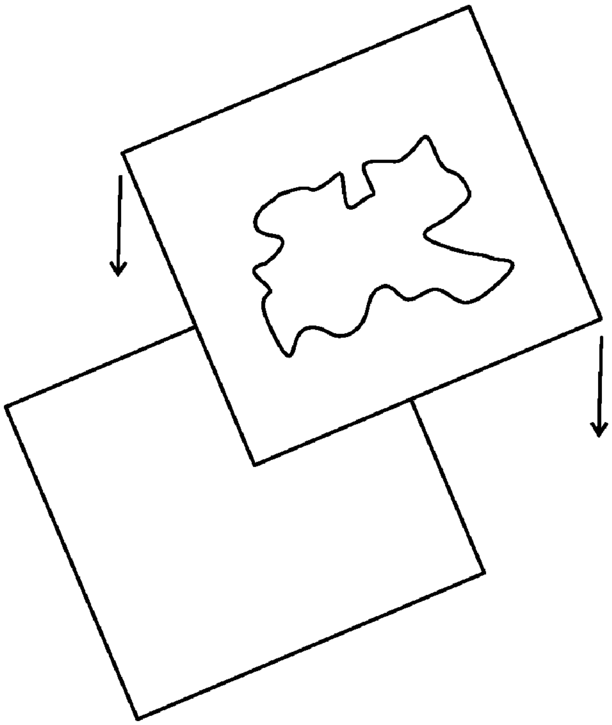
FIG. 5 depicts the placement of a black and white copy upon a selected color piece of paper to be aligned together and cut together after the copy is placed on top of the color paper using a sharp blade to cut the papers together at the same time.
Figure 6:
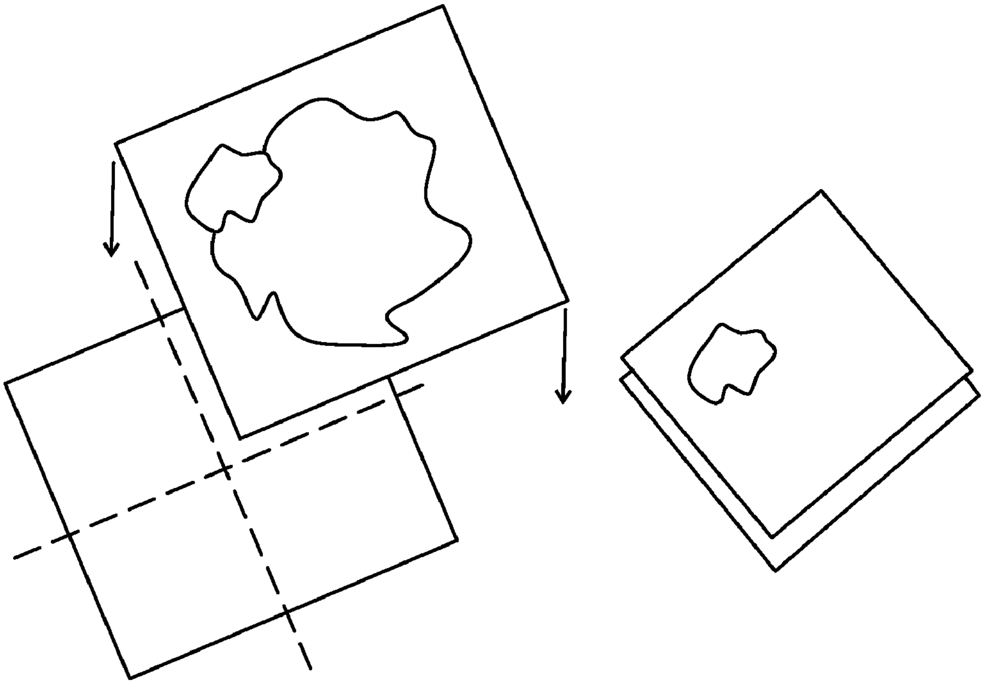
FIG. 6 depicts the lining up of the cut Black and white copy, that has on it alignment pencil lines, being lined up and placed upon the background mat for finding or locating the exact location and alignment and the second drawing to the right in this figure shows the hole in the black and white copy that is described above herein in FIG. 6, wherein FIG. 5 above the particular same shape was cut out in both the black and white paper and the color paper, which were cut out together at the same time.
Figure 7:
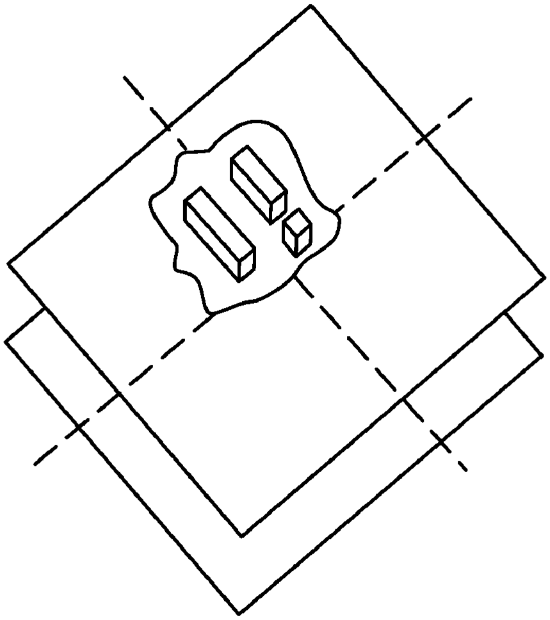
FIG. 7 shows that a color cut out shape has been placed in the right place on top of the cut out hole in a black and white copy which had been secured or placed upon the creation in progress. Then the copy paper will be removed from the artwork.
Figure 8:
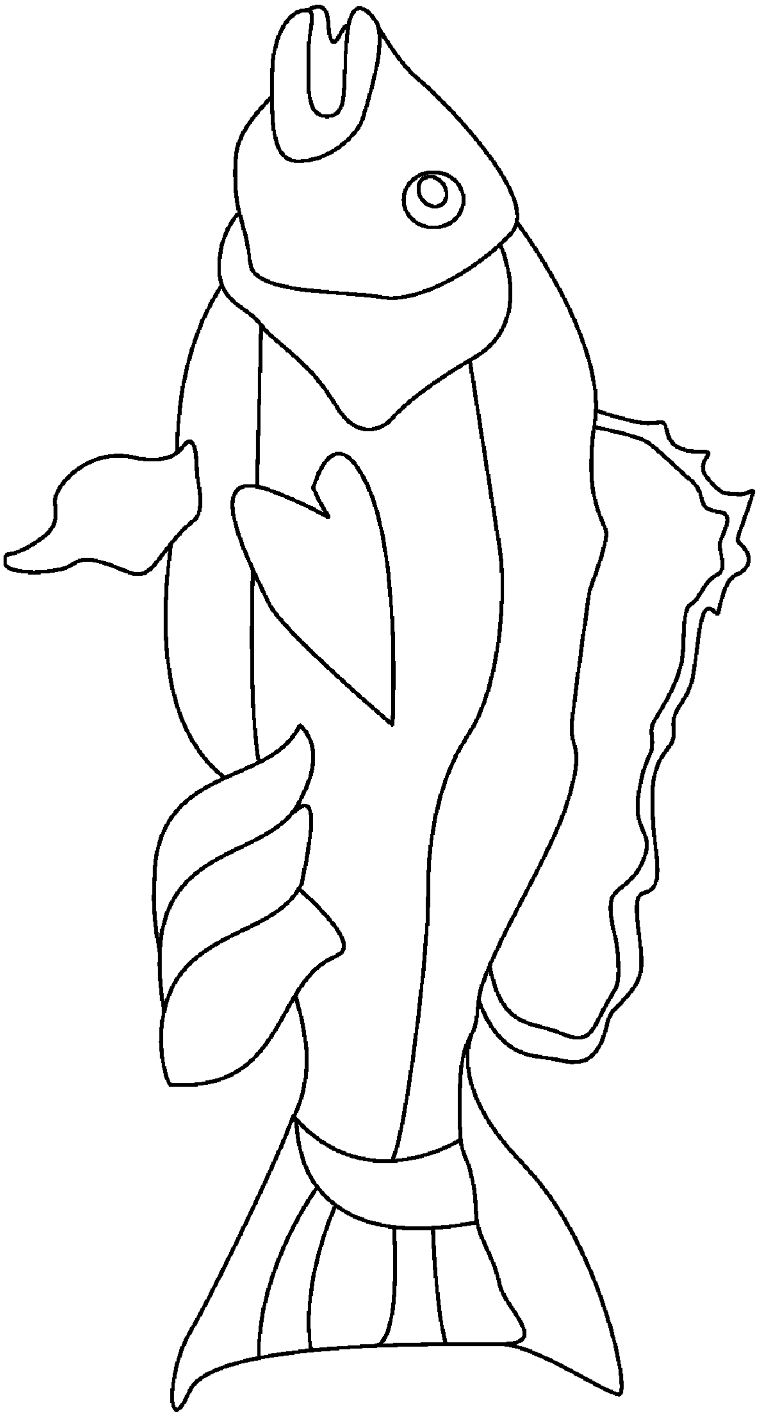
FIG. 8 depicts as best as we can illustrate in a 2-dimensional medium a finished piece which will then be mated and framed.
Figure 8A:
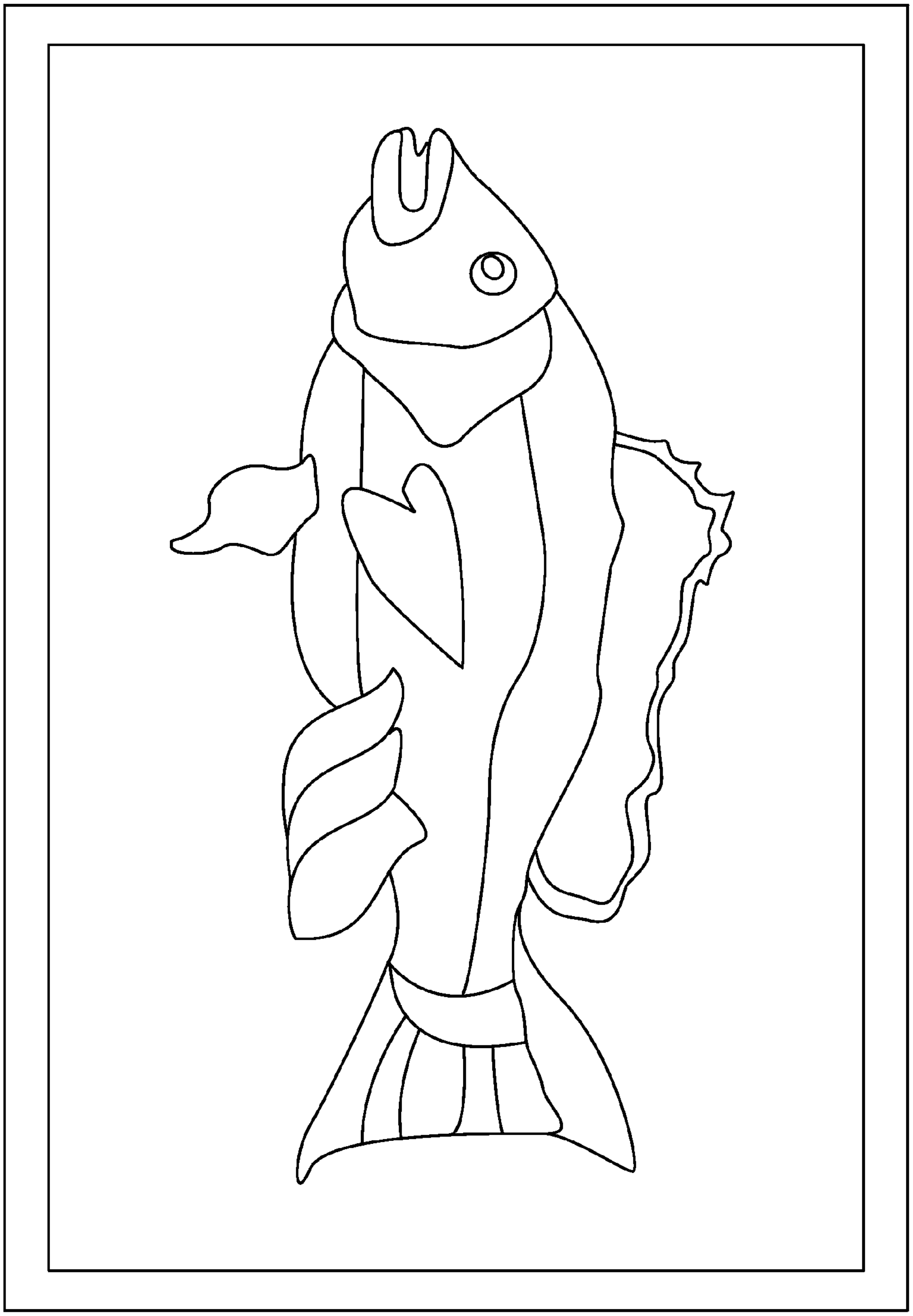
FIG. 8A depicts a finished piece after mating.
Figure 8B:
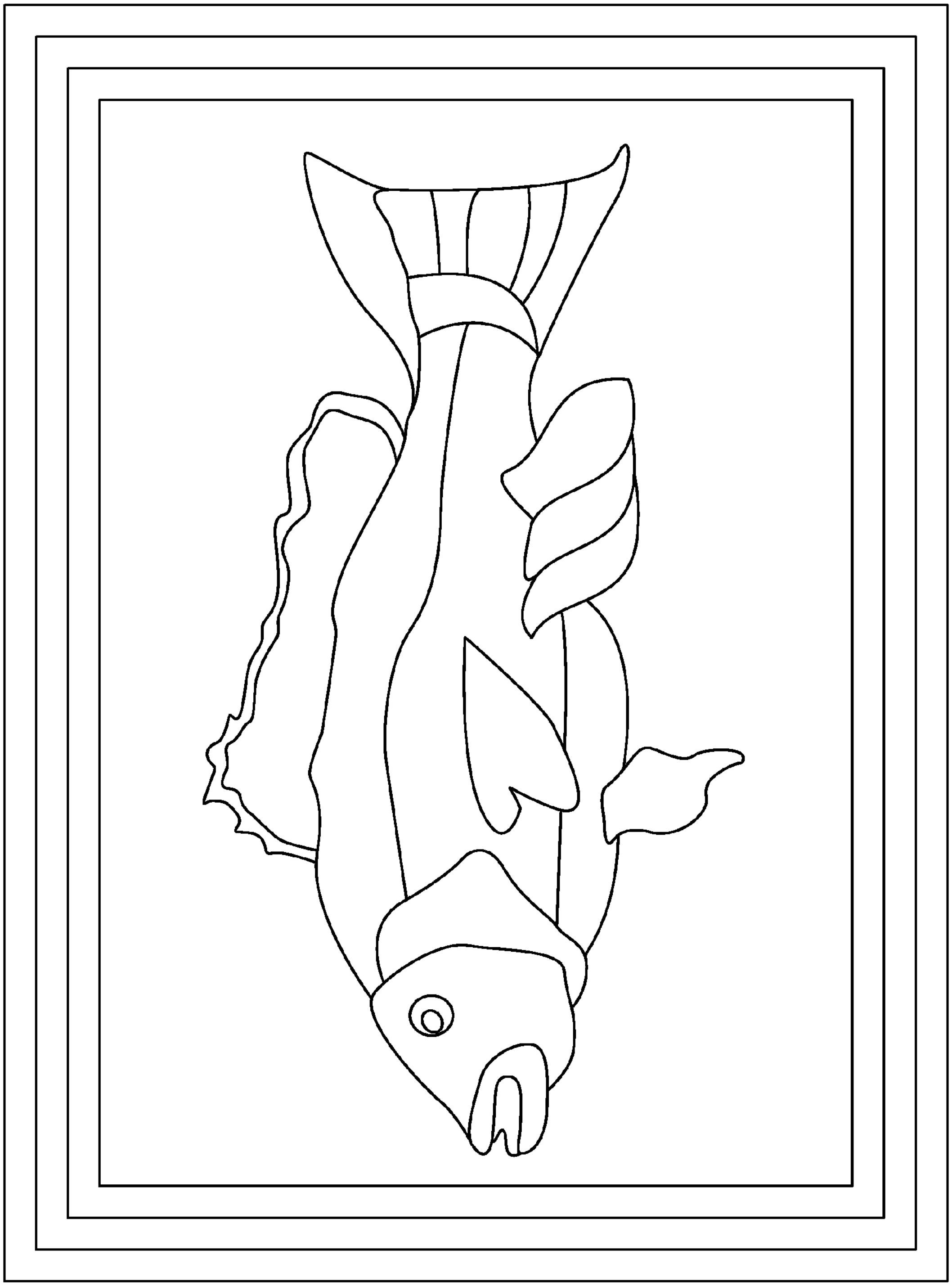
FIG. 8B depicts a finished piece after mating and framing.
Figure 9:
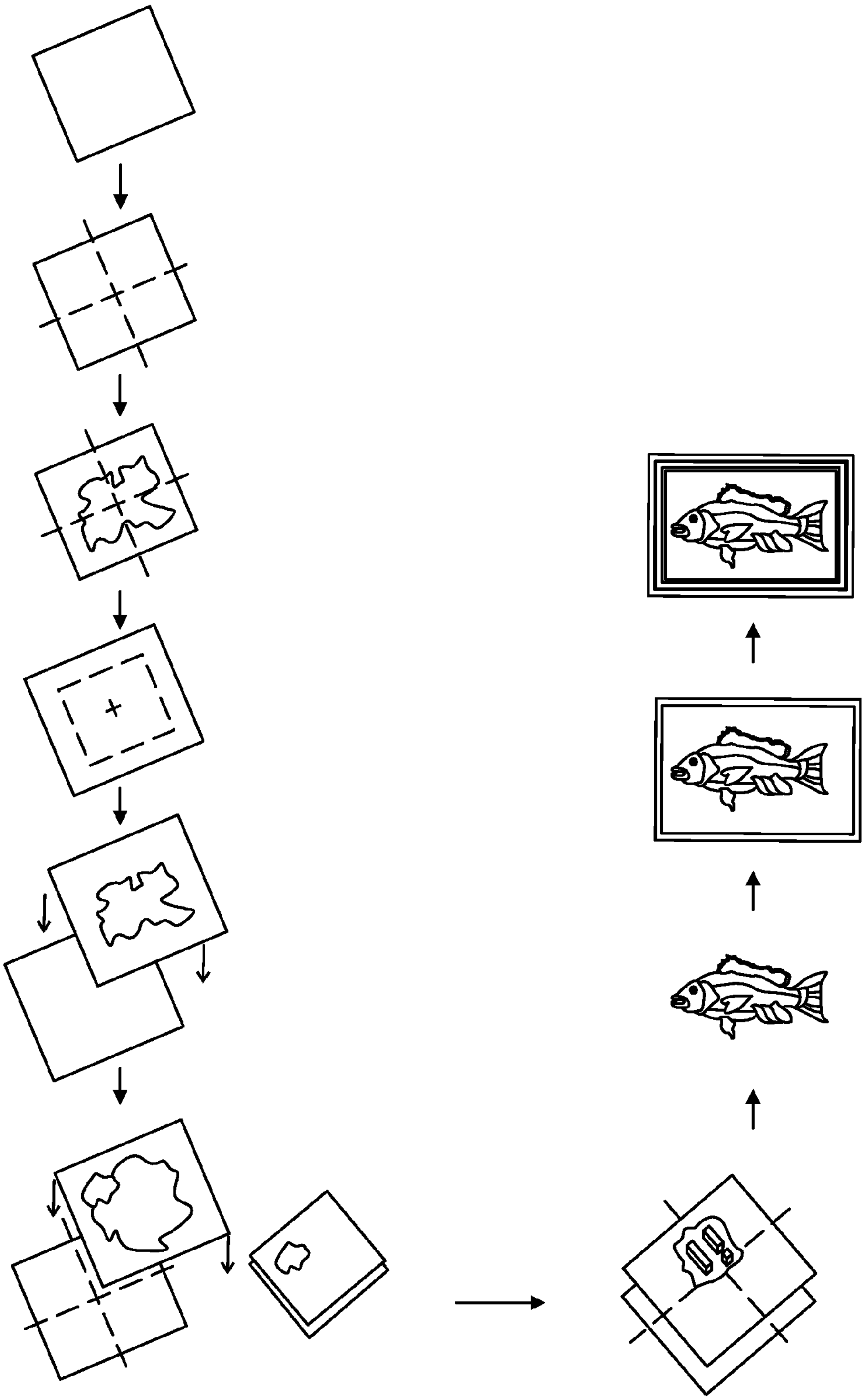
FIG. 9 is a drawing incorporating all the above described drawings in an inclusive flow chart form to illustrate the method as the steps progress to create the final created 3-dimensional resultant artwork, which is the end product of this method of Creating 3-dimensional artwork.

The present invention discusses a method to create 3-dimensional images from 2-dimensional images. Among other uses the end product of this method can be used as a free standing work of art which can be matted and framed and placed either hanging or attached to a wall or other surface or placed on an easel or other tripod mechanism for free standing on a table or floor or other surface. Consumers purchase and collect art of all different genre, sizes, and shapes. Some art is mass produced and sold in quantity, and some art is only one of kind originals, while some art is produced in only small numbers or lesser amounts. Consumers utilize art in many different ways. Some simply collect and store art, others like to display it and show off their tastes, and yet others have a variety of uses for these items. There are many artists, celebrities, manufacturers, retailers, etc. competing for the consumers business in artwork sales. Artists are continuously experimenting to come up with new and unique ways and methods to produce art, which artwork is different and can stand out and be noticed by the consumer. In a preferred embodiment, the method for creating 3-dimensional images from 2-dimensional images can be carried out by selecting an image that you would like to have created by this 3-dimensional method, making copies of the image in a size you desire, and building up and out a 3-d version from the center of a pre-selected background. By using the measuring techniques outlined in the steps of the claims below and cutting various pieces and shapes from paper. Placement of the paper cut outs on top of each other in the air space above the background mat board in any direction there from, using layering in 3 dimensions, using spacing to add depth, by utilizing foam tape or other material, as building blocks to hold the colored cut outs in a perpendicular fashion. Then the final artwork is matted and framed with glass insert.

The present invention method can be carried out by the following steps. First:

a) The Creator that will be creating the new piece of artwork will choose an already created image, or create a new piece of 2-dimensional artwork to be re-created as a 3-dimensional image.

b) The Creator will then make black and white copies of artwork to the size the creator determines to a specified size of his/her choice on a copy machine which process may include the shrinking or enlarging of the image onto the copies being created as needed. A 20# bond paper is the preferred paperweight to be used in this step for best results.

c). At least twelve (12) duplicate pieces (copies) should be made for best results in step b) above as a minimum. The exact number will change on a case by case basis depending on the amount of 3-d layers, cuts, and layers needed for this process to work best copying any one particular 2-dimensional image for the specific piece of art being produced.

d) The 3-dimensional image building process begins by creating or selecting a background mat that you will place the 3-d image upon or secure it to. So the creator shall choose a background color mat board to use or create a 2-d background design on paper and adhere, this new 2-dimensional design on paper, to a background mat board and then cut the mat board to the desired finished size. Color is varied artificially in the artwork in progress. The Creator will leave a minimum of at least 2 inches around the edge of the mat board in all directions for additional mating and/or framing (and framing under glass). The preferred size width of the mat board is 1/16". The 3-dimensional image will be mounted and centered on the mat board that has been selected, in layers, piece by piece, sometimes directly secured to the mat board and sometimes secured by way of intermediate(s) which will secure one side to another intermediate or the mat board itself and a second side to any particular cut paper piece being presently secured.

e) Find or locate the center of the mat board by measuring top to bottom, and left to right, and/or corner to corner. Make cross marks on the mat board to identify the center and other areas using a pencil. A soft #2 pencil is the preferred tool to be used. Very lightly draw the pencil lines or broken lines left to right and top to bottom to be used for location and placement of the 3-d image using the pencil. These lines will be erased in a later step with a kneaded eraser.

f) The Black and White copies that were produced in letter b) above should also be marked with cross marks using the same method described in e) above. These will be used as stencils as the layers of 3-d or cut pieces are being built up or placed in place.

g) Leave a minimum of at least 2 inches around the edge of the mat board all around the edge of the mat when centering the 3-d image. This process leaves room for framing.

h) Select the various colors to be used for the various layers of cut paper being secured to the mat board or intermediates which will be part of the finished artwork. The preferred paper weight of the paper to be used to create the cut pieces should be in the range of between 80# and 98# inclusive. The maximum weight in the above range for paper stock is the most preferred. Textured one side paper is preferred for use. The paper should be colored entirely and not have a white edge.

i) Placement of the first layer or cut piece(s) to be placed on the mat either directly or through an intermediate such as foam tape is based on measuring for the furthest image in the original 2-d image. In other words use your judgment to judge the depth of the 3-d by locating the most distant points which would appear back or behind in the picture if 3-dimensional and working forward to the images that would appear to be in the front, one layer at a time using your artistic judgment.

h) Using a sharp blade, a sharp surgical type preferred, the black and white copies are then cut along with the colored paper being held together as they are cut simultaneously. The layers build outward the black and white copies are temporarily placed upon the creation in progress to be used as stencils and place finders. This process is accomplished by the black and white copies first being laid on top of the selected project paper or colored paper and cutting through both papers together to create the 3-d layers.

i) Then place the black and white stencil (copy), that has just been cut into to create the cut out piece as described in h) above, on the center of the mat board lining the cross marks up exactly for placement thereof.

j) With the black and white copy in place, showing the open area that has been cut out place the first or next colored layer piece down in place, lining it up with the hole on the copy that is now secured in place.

k) The 3-d paper pieces are adhered to the background or other layers of cut pieces preferably by using 2-sided, 1/16" foam tape which is semi-aggressive. Layers are applied according to variable depths as you are building the final artwork piece. As the layers increase in depth, it may be necessary to apply foam tape on top of each other linking them together to create the desired depth. In some cases, pieces are attached directly to the background or to each other by using non-toxic clear glue.

l) Once all 3-d layers of shaped colored paper have been cut and attached to the work and the artwork is finished the light pencil lines are to be erased with a kneaded eraser.

m) Completed art upon completion is then mated and/or mated and framed or mated and also framed under glass.

l) Authentication can be achieved through signing and dating the work, as well as other techniques. The preferred method is having the creator place a hidden "K" cut from colored board in the piece as part of the art.

While the preferred embodiments of the invention have been described above, it will be recognized and understood that various modifications can be made in the invention and the appended claims are intended to cover all such modifications which may fall within the spirit and scope of the invention. The method is susceptible of various changes and various other uses from that shown and described and therefore the right is reserved to make such changes as will fall within the scope of the appended claims.

What is claimed is:

1. A method of creating 3-dimensional images from a 2-dimensional image comprising the steps of:

a) providing a 2-dimensional artwork;

b) making a plurality of copies of said 2-dimensional artwork;

c) providing a background color mat board;

d) cutting said mat board to a desired size with a blade;

e) locating the center of the mat board and said plurality of copies by measuring top to bottom and left to right or corner to corner;

f) marking the center of said mat board and said plurality of copies by placing cross marks on the center using a pencil and centering said 3-dimensional images;

g) providing at least 2 inches of clearance on all edges of said mat board when centering said 3-dimensional image;

h) providing various colored papers for various layers in said 3-dimensional image;

i) placing said colored paper behind each of said plurality of copies; cutting specific shaped pieces simultaneously into both said colored paper and said copy using said blade; forming a plurality of stencils with shaped opening from said plurality of copies; and a plurality of cut colored pieces from said plurality of colored papers;

j) aligning said cross marks on said stencil to said cross mark on said mat board;

k) inserting and adhering said cut colored pieces into said opening in said stencil on said mat board in progress based on a farthest image in said 2-dimensional artwork and working forward to images that appeared in the front;

l) removing said stencil after said cut colored piece is adhered to said mat board; and m) erasing all said cross marks with a kneaded eraser.

2. The method for creating 3-dimensional images from a 2-dimensional image according to claim 1, wherein said step of making a plurality of copies comprises shrinking or enlarging said image.

3. The method for creating 3-dimensional images from a 2-dimensional image according to claim 1, wherein said plurality of copies are black and white only.

4. The method for creating 3-dimensional images from a 2-dimensional image according to claim 1, wherein said plurality of copies comprising at least #20 pound white paper.

5. The method for creating 3-dimensional images from a 2-dimensional image according to claim 1, wherein said plurality of copies comprises at least 12 duplicate copies.

6. The method for creating 3-dimensional images from a 2-dimensional image according to claim 1, providing a 2-dimensional background design on a paper and adhering said background design to said mat board as background.

7. The method for creating 3-dimensional images from a 2-dimensional image according to claim 1, wherein said mat board has a thickness of 1/16".

8. The method for creating 3-dimensional images from a 2-dimensional image according to claim 1, wherein said pencil is a soft #2 pencil.

9. The method for creating 3-dimensional images from a 2-dimensional image according to claim 1, wherein said colored paper is textured.

10. The method for creating 3-dimensional images from a 2-dimensional image according to claim 1, wherein said plurality of cut colored pieces are adhered to said mat board using 2-sided, 1/16" foam tape.

11. The method for creating 3-dimensional images from a 2-dimensional image according to claim 10, wherein said foam tape is semi-aggressive.

12. The method for creating 3-dimensional images from a 2-dimensional image according to claim 10, wherein said foam tape increase the depth of said 3-dimensional images.

13. The method for creating 3-dimensional images from a 2-dimensional image according to claim 1, wherein said plurality of cut colored pieces are adhered to said mat board with non-toxic clear glue.

14. The method for creating 3-dimensional images from a 2-dimensional image according to claim 1, wherein said 3-dimensional image is mated.

15. The method for creating 3-dimensional images from a 2-dimensional image according to claim 14, wherein said 3-dimensional image is further framed.

16. The method for creating 3-dimensional images from a 2-dimensional image according to claim 15, wherein said 3-dimensional image is further framed under glass.

17. The method for creating 3-dimensional images from a 2-dimensional image according to claim 1, wherein said 3-dimensional image comprises an authentication.

18. The method for creating 3-dimensional images from a 2-dimensional image according to claim 17, wherein said authentication comprises a signature and a date.

19. The method for creating 3-dimensional images from a 2-dimensional image according to claim 17, wherein said authentication comprising a hidden "K" cut on said mat board.

20. The method for creating 3-dimensional images from a 2-dimensional image according to claim 1, wherein said blade is a sharp surgical blade.

* * * * *